(12) United States Patent
Grimm (10) Patent No.: US 11,092,177 B2
(45) Date of Patent: Aug. 17, 2021

(54) CONNECTING SYSTEM FOR FRICTION-INCREASING CONNECTION OF COMPONENTS, PROCESS FOR FIXING A CONNECTING SYSTEM TO A COMPONENT AND USE OF A CONNECTING ELEMENT

(71) Applicant: 3M INNOVATIVE PROPERTIES COMPANY, St. Paul, MN (US)

(72) Inventor: Florian T. Grimm, Kempten (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 16/642,296

(22) PCT Filed: Aug. 27, 2018

(86) PCT No.: PCT/IB2018/056505
§ 371 (c)(1),
(2) Date: Feb. 26, 2020

(87) PCT Pub. No.: WO2019/043555
PCT Pub. Date: Mar. 7, 2019

(65) Prior Publication Data
US 2020/0386252 A1 Dec. 10, 2020

(30) Foreign Application Priority Data
Aug. 28, 2017 (EP) ..................................... 17188156

(51) Int. Cl.
*F16B 5/02* (2006.01)
*F16B 2/00* (2006.01)
(Continued)

(52) U.S. Cl.
CPC .............. *F16B 5/02* (2013.01); *F16B 2/005* (2013.01); *F03D 1/06* (2013.01); *F03D 13/10* (2016.05);
(Continued)

(58) Field of Classification Search
CPC .......................... Y10T 29/49826; F16B 5/02
See application file for complete search history.

(56) References Cited

U.S. PATENT DOCUMENTS 3,598,631 A * 8/1971 Papst ...................... B64B 1/64
427/11
4,740,111 A 4/1988 Gagnon
(Continued)

FOREIGN PATENT DOCUMENTS

CN 104948601 A 9/2015
EP 2 677 601 A1 12/2013
(Continued)

OTHER PUBLICATIONS

1507 Extended EP Search Report for EP17188156.8, dated Feb. 15, 2018, 8 pages.
(Continued)

*Primary Examiner* — Jason L Vaughan
*Assistant Examiner* — Amanda Kreiling
(74) *Attorney, Agent, or Firm* — Thomas M. Spielbauer (57) ABSTRACT

The present disclosure relates to a connecting element and to a process for producing said connecting element. The present disclosure further relates to a connecting system and a device comprising said connecting element, and to a process for fixing said connecting element to a first component. The present disclosure further relates to the use of said connecting element and connecting system for friction-increasing connection of a first and a second component in energy generation, specifically in wind turbines and hydropower turbines, and in machine, plant, motor vehicle and aircraft construction.

13 Claims, 6 Drawing Sheets

(51) Int. Cl.
*F03D 13/10* (2016.01)
*F03D 1/06* (2006.01)

(52) U.S. Cl.
CPC ....... *F05B 2230/90* (2013.01); *F05B 2240/30* (2013.01); *F05B 2260/301* (2013.01)

(56) References Cited

U.S. PATENT DOCUMENTS

| | | | |
|---|---|---|---|
| 6,347,905 B1 | 2/2002 | Luckschandel | |
| 2010/0044524 A1* | 2/2010 | Sugaya | F16B 33/002 |
| | | | 248/49 |
| 2010/0171317 A1* | 7/2010 | Trede | F16B 2/005 |
| | | | 290/55 |

FOREIGN PATENT DOCUMENTS

| | | | | |
|---|---|---|---|---|
| WO | WO 2008-095216 | 8/2008 | | |
| WO | WO 2012-116085 | 8/2012 | | |
| WO | WO-2012116085 A1 * | 8/2012 | ............. | B21D 28/34 |

OTHER PUBLICATIONS

International Preliminary Report on Patentability for PCT International Application No. PCT/IB2018/056505, dated Aug. 12, 2019, 14 pages.
International Search Report for PCT International Application No. PCT/IB2018/056505, dated Dec. 11, 2018, 6 pages.

\* cited by examiner

CONNECTING SYSTEM FOR FRICTION-INCREASING CONNECTION OF COMPONENTS, PROCESS FOR FIXING A CONNECTING SYSTEM TO A COMPONENT AND USE OF A CONNECTING ELEMENT

CROSS REFERENCE TO RELATED APPLICATIONS

This application is a national stage filing under 35 U.S.C. 371 of PCT/IB2018/056505, filed Aug. 27, 2018, which claims the benefit of European Application No. 17188156.8, filed Aug. 28, 2017, the disclosure of which is incorporated by reference in their entirety herein.

TECHNICAL FIELD

The present disclosure relates to a connecting element for friction-increasing connection of components to be joined.

BACKGROUND

Force-locked connections are frequently used in all areas of machine, plant and motor vehicle construction and energy generation for the transmission of forces or torques. The size of the force which can be respectively transmitted depends not only on the structural design but also primarily on the static friction value (coefficient of static friction) of the component surfaces connected to one another. Therefore, in the case of such force-locked connections, it is endeavored to provide friction-increasing measures that allow the greatest possible transverse forces and torques to be transmitted safely. Further, force-locked connections may also be referred to as non-positive connections or frictional connections.

It is known to use friction-increasing interlayers to increase the holding forces or increase the torques than can be transmitted in bolted and clamped connections. U.S. Pat. No. 6,347,905 B1 discloses a connecting element for the friction-increasing play-free reversible connection of components to be joined. The connecting element comprises a spring-elastic steel foil which bears on its surface particles of a defined size, which are fixed on the spring-elastic foil by means of a binder phase. The particles consist of a hard material, preferably of diamond, cubic boron nitride, aluminum oxide, silicon carbide or boron carbide. By using this separate connecting element, the coefficient of static friction can be increased in frictional connections.

Such connecting elements can also be used for friction-increasing connection of large components e.g. in wind turbines or hydropower stations. For example, connecting elements are used for friction-increasing connection of rotor shaft and rotor hub of a wind turbine. US2010/0171317A1 discloses a connection of two components of a wind turbine, wherein disposed between the two components there is a plurality of intermediate connecting bodies, the intermediate connecting bodies having a coating including hard particles on at least one contact surface. The coated contact surface acts to increase the coefficient of friction when forming the connection. The intermediate connecting bodies form a segmented ring or parts thereof. The intermediate connecting bodies are designed to be plate-shaped or like small blocks, for example with a thickness of 5 mm. The intermediate connecting bodies have one or more through borings so that the intermediate connecting bodies can be penetrated by bolts or screws of a flange connection between two components to be connected. In addition to that, the intermediate connecting bodies have smaller bore holes so that mounting components in the form of countersunk screws penetrate the smaller bore holes which enables or simplifies mounting or pre-assembling the intermediate connecting bodies on a flange ring, for example.

For friction-increasing connection of large components, such as in wind turbines or hydropower stations, also thinner connecting elements can be used, for example with a thickness of 0.8 mm or 0.5 mm or 0.4 mm or 0.2 mm. By using thinner connecting elements, there are no design changes that need to be made for the two components to be connected, and the weight of the connecting elements is reduced compared to plates.

For pre-assembling of thinner connecting elements having a thickness of 0.8 mm or less to one of the two components to be connected, countersunk screws as disclosed in US2010/0171317A1 cannot be used. For connecting elements having a thickness of only at most 0.8 mm, the head of the screw or bolt cannot be sunk into the connecting element and would protrude from the connecting element. Therefore proper function of the connecting element would not be possible, as the connecting element could not have close contact with the second component to be connected and torque transmission would not be possible.

Therefore, there is a need to further improve frictional connections of components with respect to mechanical pre-assembly of connecting elements having a thickness of 0.8 mm or less.

As used herein, "a", "an", "the", "at least one" and "one or more" are used interchangeably. Adding an "(s)" to a term means that the term should include the singular and plural form. E.g. the term "opening(s)" means one opening and more openings (e.g. 2, 3, 4, etc.). The term "comprise" shall include also the terms "consist essentially of" and "consists of".

SUMMARY

In a first aspect, the present disclosure relates to a connecting element, comprising a metal substrate having two opposite joining surfaces, wherein the joining surfaces are provided with hard particles, which are fixed on the metal substrate by means of a metallic binder layer, and wherein the metal substrate has at least one opening having an outer contour and an inner hole, and wherein at the outer contour of the opening there is at least one extension of the metal substrate, wherein the at least one extension is directed towards the inner hole of the opening.

In another aspect, the present disclosure also relates to a connecting system, comprising a connecting element as disclosed herein and at least one fastening element, wherein the number of fastening elements corresponds to the number of openings of the metal substrate of the connecting element, and wherein the at least one fastening element has a shaft and a head, the shaft of the fastening element and the inner hole of the at least one opening being dimensioned so that the shaft of the fastening element can be inserted into the inner hole of the at least one opening.

In yet a further aspect, the present disclosure relates to a device comprising a connecting system as disclosed herein and a first component having a joining surface, wherein the first component has a recess having an upper part at the joining surface of the first component and a lower part, and wherein the lower part of the recess is a bore corresponding to the shaft of the fastening element, and wherein the upper part of the recess has a height being at least the sum of the height of the head of the fastening element and the thickness of the at least one extension of the metal substrate, and wherein the upper part of the recess has a diameter being at least the sum of the diameter of the head of the fastening element and the thickness of the at least one extension of the metal substrate.

In yet a further aspect, the present disclosure relates to a process for fixing a connecting element as disclosed herein to a first component which has a joining surface, comprising
providing a connecting system as disclosed herein,
providing a recess in the first component, wherein the recess has an upper part at the joining surface and a lower part, and wherein the lower part of the recess is a bore corresponding to the shaft of the at least one fastening element of the connecting system, and wherein the upper part of the recess has a height being at least the sum of the height of the head of the fastening element and the thickness of the metal substrate and of the metallic binder layer, and wherein the upper part of the recess has a diameter being at least the sum of the diameter of the head of the fastening element and the thickness of the metal substrate and of the metallic binder layer,
inserting the shaft of the fastening element into the inner hole of the at least one opening of the metal substrate and the bore of the first component,
fastening the fastening element,
bending down the at least one extension of the at least one opening by fastening the fastening element, and causing the at least one extension to lie at least partially below the head of the fastening element by fastening the fastening element,
thereby fixing the connecting element to the first component,
wherein the head of the fastening element after fastening the fastening element is not protruding from the connecting element.

In yet a further aspect, the present disclosure relates to a process for producing a connecting element as disclosed herein, comprising
providing a metal substrate having two opposite joining surfaces,
providing in the metal substrate at least one opening having an outer contour and an inner hole, wherein at the outer contour of the at least one opening there is at least one extension of the metallic substrate, wherein the at least one extension is directed towards the inner hole of the opening,
and coating the joining surfaces with hard particles and fixing them on the metal substrate by means of a metallic binder layer.

In yet a further aspect, the present disclosure relates to the use of a connecting element as disclosed herein, or of a connecting system as disclosed herein, for friction-increasing connection of a first and a second component in energy generation, specifically in wind turbines and hydropower turbines, and in machine, plant, motor vehicle and aircraft construction.

The connecting system disclosed herein facilitates pre-assembly of the connecting element. By pre-assembling, the connecting element is mechanically fixed to one of the two components to be connected. After having pre-assembled the connecting element to one of the two components to be connected, bolts or screws can be used for assembling the two components to be connected with the connecting element.

By fixing the connecting element disclosed herein to a first component, the connecting element is pre-assembled on the first component. This is helpful to attach the connecting element either in the workshop or in the field by vertically or horizontally mounting. By this mechanically fixing it can also be avoided that the connecting element or segments of the connecting elements fall apart when mounting the first and second component, i.e. when frictionally joining the first and second component with the connecting element. This is for example useful when mounting needs to be done at the top of the tower of a wind turbine.

The connecting element disclosed herein can be disconnected and can be reused after being detached from the first component or when the two components after frictionally joining are detached and attached again.

Another advantage of the connecting element and connecting system disclosed herein, being fixed and thus pre-assembled to a first component, is that all segments of the connecting element are reliably at one of the two components to be joined when disassembling the connection, in the case that the connecting element is composed of a plurality of segments.

A further advantage of the connecting element disclosed herein is that the pre-assembly of the connecting element can be done already on the ground before bringing the components, for example rotor hub and rotor shaft of a wind turbine, on top of the tower of the wind turbine. The pre-assembly can for example also be done already by the supplier of the gearbox for the wind turbine.

BRIEF DESCRIPTION OF THE DRAWINGS

The present disclosure is explained in more detail on the basis of the drawings, in which FIG. 1 schematically shows a plan view of a ring-shaped connecting element of the present disclosure, the connecting element being composed of a plurality of individual segments.

FIGS. 2 A and 2 B each schematically shows a plan view of an individual segment of the connecting element of FIG. 1, before (FIG. 2 A) and after (FIG. 2 B) pre-assembling or fixing of the connecting element to a first component.

FIG. 2 C shows an enlarged detail of an opening shown in FIG. 2 A, FIG. 2 D shows an enlarged detail of an opening shown in FIG. 2 B.

FIGS. 3 A-3 K show details of a connecting element of the present disclosure, representing various forms of an opening of the metal substrate of the connecting element.

FIGS. 4 A and 4 B each schematically shows a cross-sectional view of a device of the present disclosure, comprising a connecting element, a fastening element and a first component, before (FIG. 4 A) and after (FIG. 4 B) pre-assembling or fixing the connecting element to the first component.

FIG. 5 A schematically shows a plan view of a detail of a connecting element of the present disclosure, representing an opening of the metal substrate of the connecting element, before fixing the connecting element to a first component.

FIG. 5 B shows a detail of a connecting system of the present disclosure. FIG. 5 B schematically shows a plan view of a detail of a connecting element of the present disclosure and the head of a fastening element, representing an opening of the metal substrate of the connecting element after pre-assembling or fixing the connecting element to a first component. The first component is not shown in FIG. 5 B.

FIGS. 6 A-6 F each schematically shows a plan view of an individual segment of a ring-shaped connecting element

DETAILED DESCRIPTION

The hard particles preferably consist of a material which, under the particular conditions of use, does not react chemically either with the materials of the components to be joined or with environmental media. It is preferably an inorganic material.

Preferably, the hard particles are selected from the group consisting of carbides, nitrides, borides, silicon dioxide, aluminum oxide, diamond and mixtures thereof. Examples of carbides are silicon carbide, tungsten carbide and boron carbide, examples of nitrides are silicon nitride and cubic boron nitride. Preferably, diamonds are used as hard particles.

The size of the hard particles is selected in such a way that the damage to the joining surfaces caused by the particles being pressed into the surface does not reach an impermissible level. Preferably, this is ensured if the particle diameter is not greater than about three times the peak-to-valley height of the joining surfaces, with peak to valley results from machining of the joining surfaces. A mean particle size of 100 μm ($d_{50}$) or less generally fulfils this requirement. For example, hard particles with a mean particle size ($d_{50}$) of 10 μm, 25 μm, 35 μm, 55 μm, 75 μm or 100 μm can be used. In some embodiments, hard particles with a mean particle size ($d_{50}$) from 10 to 100 μm are used, or from 25 to 75 μm. The mean particle size can be measured by laser diffraction, for example by wet measurement using a Cilas granulometer.

The hard particles should have a narrow grain size range in which the scatter about a given nominal diameter amounts to no more than about +/−50%. In some embodiments, the scatter about a given nominal diameter should not amount to more than about +/−25%.

The number of hard particles per unit surface area of the joining surfaces of the connecting element may be selected in such a way that the normal force which is available for joining the components together is sufficient to ensure that the particles are pressed into the surface of the components to be joined. This will generally be the case if the area percentage of the joining surfaces of the connecting element which is covered with hard particles is from 3% to 60%. The area percentage of the joining surfaces of the connecting element which is covered with hard particles can be selected dependent on the mean particle size ($d_{50}$) of the hard particles. For example, for a mean particle size ($d_{50}$) of the hard particles of 10 μm from about 8% to 30% of the joining surfaces of the connecting element may be covered with hard particles, for a mean particle size ($d_{50}$) of 35 μm the area percentage may be from about 15 to 45%, and for a mean particle size ($d_{50}$) of 70 μm, the area percentage may be from about 25% to 60%.

The metal substrate may be made from steel, for example from unalloyed steel. Also high-alloy steel or stainless steel can be used. Examples for unalloyed steel are grade C75S-1.1248 according to DIN EN 10132-4 or grade C60S-1.1211 according to DIN EN 10132-4.

The thickness of the metal substrate is selected depending on the application. In some embodiments, the thickness of the metal substrate is up to 0.8 mm. In other embodiments, the thickness is up to 0.5 mm. In some other embodiments, the thickness is up to 0.4 mm, and in some other embodiments, the thickness is up to 0.2 mm.

The metallic binder layer may be a nickel layer.

The thickness of the metallic binder layer may be from 5 to 75 μm. In some embodiments, the thickness of the metallic binder layer may be from 10 to 50 μm. In some other embodiments, the thickness of the metallic binder layer may be from 10 to 25 μm.

In some embodiments, the thickness of the metallic binder layer is not more than 75% of the mean particle size ($d_{50}$) of the hard particles. In some other embodiments, the thickness of the metallic binder layer is not more than 60% of the mean particle size ($d_{50}$) of the hard particles. In yet some further embodiments, the thickness of the metallic binder layer is not more than 50% of the mean particle size ($d_{50}$) of the hard particles. In yet some other embodiments, the thickness of the metallic binder layer is not more than 20% of the mean particle size ($d_{50}$) of the hard particles. The thickness of the metallic binder layer may be at least 5 μm. The thickness of the metallic binder layer may be selected dependent on the mean particle size of the hard particles. For a larger particle size of the hard particles, a higher thickness of the metallic binder layer may be suitable. The hard particles are protruding from the metallic binder layer. When the connecting element is in frictional engagement with the components to be joined, the hard particles are pressed into the surfaces of the components to be joined, therefore increasing the coefficient of friction of the connection.

The metal substrate has at least one opening. The opening may be used for fixing the connecting element to a first component, thereby pre-assembling the connecting element to the first component. The metal substrate may have one, two, three, four or more openings, thereby allowing that the connecting element can be fixed at one, two, three, four or more positions to a first component. The connecting element may be composed of a plurality of individual segments, or may consist of one single segment. For example, the connecting element may be ring-shaped and may be composed of a plurality of individual segments. The connecting element may also be ring-shaped and consist of one single element. The connecting element may also be plate-shaped, the plate having for example a rectangular, square, triangular, circular, elongated or oval form. If the connecting element is composed of a plurality of individual segments, the metal substrate of each individual segment has at least one opening and may have one, two, three, four or more openings.

The at least one opening has an outer contour and an inner hole. At the outer contour of the opening there is at least one extension of the metal substrate. The at least one extension is directed towards the inner hole of the opening.

At the outer contour of the at least one opening, there may be one or more extensions of the metal substrate. Preferably there is more than one extension at the outer contour of the at least one opening, specifically 4 to 12 extensions, more specifically 6 to 10 extensions, and even more specifically 8 extensions.

Depending on the thickness of the metal substrate and the size of the fastening element to be inserted in the inner hole, different shapes and numbers of the extensions may be suitable.

The connecting element may be planar. The at least one extension may extend in the plane of the connecting element. The planarity of the connecting element and the extensions facilitates the production, the transportation and the handling of the connecting element.

In some embodiments, the inner hole of the at least one opening may be a central hole, which means the inner hole is located in the center of the at least one opening.

Typically, the inner hole of the openings may have a diameter of from 2 to 20 mm. For many applications, a diameter of the inner hole of from 7 to 10 mm may be suitable.

In some embodiments, the at least one extension is provided with hard particles, which are fixed on the metal substrate by means of a metallic binder layer. The at least one extension may also not be provided with hard particles being fixed on the metal substrate by means of a metallic binder layer, but for production of the connecting element it is more convenient to have the at least one extension provided with hard particles, because no masking is then required for the coating process.

The connecting element as disclosed herein can be used for frictional connection of a first and a second component. By using a connecting element as disclosed herein for frictional connection of a first and a second component, the coefficient of static friction is increased. Thus, the connecting element as disclosed herein is providing a friction-increasing connection of a first and second component. By using a connecting element as disclosed herein, the increase of the coefficient of static friction can be up to a factor of 2 or even up to a factor of 4, depending on the material and the surface conditions of the first and second component.

The connecting element as disclosed herein can be pre-assembled by fixing it to a first component of a frictional connection. For pre-assembling the connecting element, a connecting system can be used which comprises the connecting element as disclosed herein and at least one fastening element. The number of fastening elements corresponds to the number of openings of the metal substrate of the connecting element. For each opening of the metal substrate, one fastening element is used for fixing the connecting element to a first component. The at least one fastening element has a shaft and a head. The shaft of the at least one fastening element and the inner hole of the at least one opening are dimensioned so that the shaft of the at least one fastening element can be inserted into the inner hole of the at least one opening.

The fastening element may be for example a screw, or a bolt, or a nail. Preferably, a screw is used as fastening element, having a screw shaft and a screw head.

The type of screw which may be used for the connecting system disclosed herein may be a countersunk screw. The countersunk screw may have a conical screw head. The countersunk screw may have a crosshead screw head, an internal hexagon screw head or a Torx screw head.

The outer contour of the at least one opening of the metal substrate of the connecting element has a circumscribed circle. The diameter of the circumscribed circle should be at least the outer diameter of the head of the fastening element of the at least one fastening element of the connecting system. Smaller diameters are possible, but the force which would be required to bend down the extension(s) of the opening(s) would be higher than for diameters being at least the outer diameter of the head of the fastening element. Preferably, the diameter of the circumscribed circle is larger than the outer diameter of the head of the fastening element of the at least one fastening element of the connecting system. More preferably, the diameter of the circumscribed circle is the outer diameter of the head of the fastening element multiplied by a factor of 1.01, more preferably multiplied by a factor of 1.2. The diameter of the circumscribed circle should be at most the outer diameter of the head of the fastening element multiplied by a factor of 2.0. More specifically, the diameter of the circumscribed circle may be at most the outer diameter of the head of the fastening element multiplied by a factor of 1.75. Even more specifically, the diameter of the circumscribed circle may be at most the outer diameter of the head of the fastening element multiplied by a factor of 1.55.

The diameter of the inner hole of the at least one opening of the metal substrate should be at least the diameter of the shaft of the fastening element, so that the shaft of the fastening element can be inserted into the inner hole of the at least one opening. The diameter of the inner hole of the at least one opening can be larger than the diameter of the shaft of the fastening element, because this facilitates inserting of the shaft of the fastening element into the inner hole. The diameter of the inner hole may be at least the diameter of the shaft of the fastening element, multiplied by the factor of 1.05.

The diameter of the inner hole of the at least one opening of the metal substrate may be at most the diameter of the shaft of the fastening element, multiplied by the factor of 1.50. More specifically, the diameter of the inner hole of the at least one opening may be at most the diameter of the shaft of the fastening element, multiplied by the factor of 1.15.

Further disclosed herein is also a device comprising the connecting system disclosed herein and a first component having a joining surface. The first component is provided with a recess. The recess has an upper part at the joining surface of the first component and a lower part. The lower part of the recess is a bore corresponding to the shaft of the fastening element of the at least one fastening element of the connecting system. The lower part of the recess may be a threaded bore, for example if a screw is used as fastening element. The upper part of the recess may have a conical form corresponding to the head of the at least one fastening element of the connecting system, for example if a countersunk screw with a conical screw head is used as fastening element. The upper part of the recess has a height being at least the sum of the height of the head of the fastening element and the thickness of the metal substrate and of the metallic binder layer. The upper part of the recess may have a height being larger than the sum of the height of the head of the fastening element and the thickness of the metal substrate and of the metallic binder layer. In some embodiments, the upper part of the recess may have a height being up to 100 μm plus the sum of the height of the head of the fastening element and the thickness of the metal substrate and of the metallic binder layer. In some other embodiments, the height of the upper part of the recess may have a height being up to 250 μm or up to 500 μm plus the sum of the height of the head of the fastening element and the thickness of the metal substrate and the metallic binder layer. The upper part of the recess may have a diameter at the joining surface being at least the sum of the diameter of the head of the fastening element and the thickness of the metal substrate and of the metallic binder layer. The upper part of the recess may have a diameter at the joining surface being at most the diameter of the circumscribed circle of the at least one opening of the connecting element of the connecting system.

For pre-assembling the connecting element to a first component of a frictional connection, the at least one fastening element is inserted in the inner hole of the at least one opening of the metal substrate and the bore of the first component. The fastening element is then fastened, and by fastening of the fastening element the at least one extension of the at least one opening is bent down and is lying at least partially below the head of the fastening element. Thereby the connecting element is fixed to the first component and thus pre-assembled. The head of the fastening element after fastening the fastening element is not protruding from the connecting element. The head of the fastening element after fastening the fastening element is located within the upper part of the recess of the first component, the shaft of the fastening element is in the lower part. After the at least one extension of the at least one opening has been bent down, the remaining parts of the connecting element with the exception of the extensions that have been bent down have a flat surface, there are no bulges or elevations at the bending points.

If a screw is used as fastening element, the at least one screw is inserted in the inner hole of the at least one opening of the metal substrate and the threaded bore of the first component. The screw is then tightened, and by tightening of the screw the at least one extension of the at least one opening is bent down and is lying at least partially below the screw head.

If a nail is used as fastening element, the at least one nail is inserted in the inner hole of the at least one opening of the metal substrate and the bore of the first component. The nail is then driven in, and by driving in the nail the at least one extension of the at least one opening is bent down and is lying at least partially below the nail head.

The first component may be for example a component of a wind turbine, such as a rotor shaft. The first component may also be for example a component of a hydropower plant, such as a turbine wheel or a generator shaft. The first component may also be any other machine component, specifically larger machine components with at least one dimension of 0.5 m or more.

The device as disclosed herein may also comprise a second component having a joining surface. The first and second component of the device are frictionally joined with the connecting element. By frictionally joining, the joining surfaces of the first and second component are brought in close contact with the two opposite joining surfaces of the connecting element, the connecting element being located between the first and second component. For frictionally joining, the connecting element is fixed to the first component as described above, and then the second component is connected with the first component and the connecting element, for example by using screws or bolts. The at least one opening of the metal substrate of the connecting element may be located within the joining surface of the connecting element opposite to the second component, i.e. opposite of the joining surface of the second component. This is possible because the head of the fastening element after fastening the fastening element is not protruding from the connecting element, and because there are no bulges or elevations at the bending points of the at least one extension of the at least one opening after the at least one extensions has been bent down.

Further disclosed herein is also a process for fixing the connecting element disclosed herein to a first component which has a joining surface, comprising
  providing a connecting system as disclosed herein,
  providing a recess in the first component, wherein the recess has an upper part at the joining surface and a lower part, and wherein the lower part of the recess is a bore corresponding to the shaft of the fastening element of the at least one fastening element of the connecting system, and wherein the upper part of the recess has a height being at least the sum of the height of the head of the fastening element and the thickness of the metal substrate and of the metallic binder layer, and wherein the upper part of the recess has a diameter at the joining surface being at least the sum of the diameter of the head of the fastening element and the thickness of the metal substrate and of the metallic binder layer,
  inserting the shaft of the fastening element into the inner hole of the at least one opening of the metal substrate and the bore of the first component,
  fastening the fastening element,
  bending down the at least one extension of the at least one opening by fastening the fastening element, and causing the at least one extension to lie at least partially below the head of the fastening element by fastening the fastening element,
  thereby fixing the connecting element to the first component,
wherein the head of the fastening element after fastening the fastening element is not protruding from the connecting element.

If a screw is used as fastening element, the screw may be tightened up to the maximum force of the screw. When fastening the fastening element, some of the hard particles may be peeled off from the metallic binder layer, and a small part of the metallic binder layer may be peeled off in the region where the extensions are bent down, but as this happens only on a relatively small area of the connecting element it does not affect the function of the connecting element.

The force which is required for fastening the fastening element, for example for tightening the screw, and bending down the extensions is higher when the extensions are provided with hard particles being fixed on the metal substrate by means of a metallic binder layer. This is due to the effect that hard particles and small parts of the metallic binder layer are peeled off. The hard particles remain in a small gap between the fastening element and the extensions, contributing to securing the fastening element against loosening.

The outer contour of the at least one opening of the metal substrate may have no sharp edges, specifically the transitions from the outer contour at the circumscribed circle to the outer contour at the extensions may be rounded. This has the advantage that the extensions will not tear at the transitions when the extensions are bent down by fastening the fastening element inserted in the inner hole of the opening. The extensions at their end at the inner hole of the opening may also have a rounded shape.

It is also possible to bend down the extensions before inserting the shaft of a fastening element into the inner hole of the at least one opening of the metal substrate.

Various embodiments of the connecting element and the device according to the present disclosure are shown in the drawings.

Figure 1:
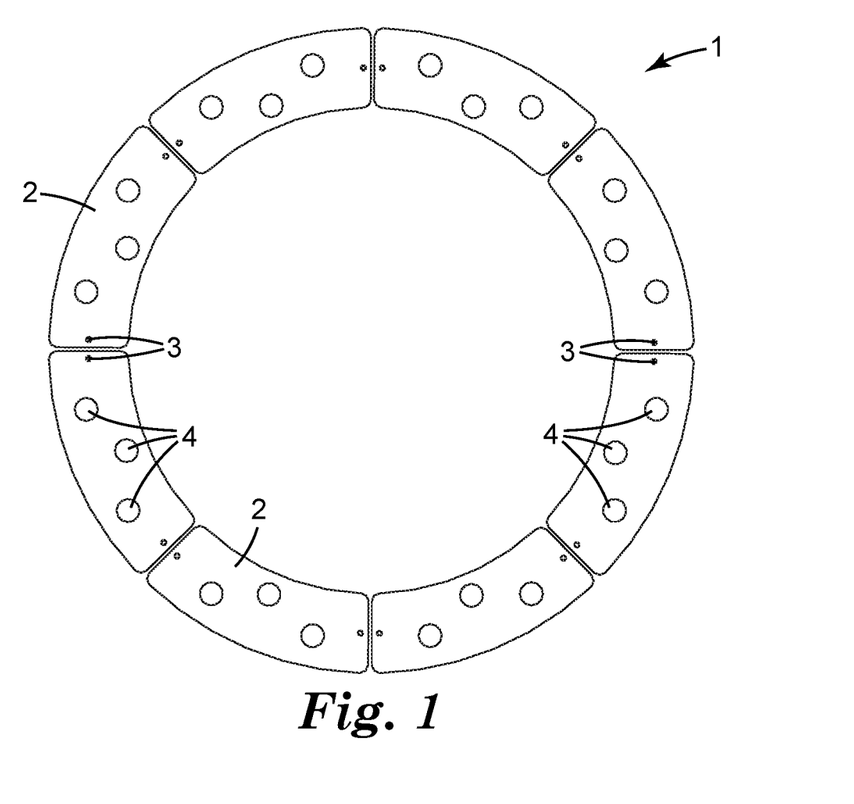

FIG. 1 schematically shows a plan view of a connecting element 1 of the present disclosure. The connecting element 1 is ring-shaped and is composed of eight individual segments 2. The connecting element of FIG. 1 can be used for a flange connection, for example for a flange connection of a first and a second component of a wind turbine or a hydropower plant, specifically of rotor hub and rotor shaft of a wind turbine, or of turbine wheel and generator shaft of a hydropower plant. The connecting element is disposed between the first and second component. The first and second component are not shown in FIG. 1. In each individual segment 2 of the connecting element 1 there are provided two openings 3 of the metal substrate of the connecting element 1. Besides the openings 3, there may be provided holes 4 in each individual segment, the holes 4 being larger than the openings 3. Screws or bolts are put through the holes 4 which are used for connecting the first and second component with the connecting element disposed between the first and second component. The openings 3 are used for pre-assembling the connecting element 1 to the first component. The outer diameter of the connecting element may be 0.5 m or more, or 1.0 m or more, or 2.0 m or more, or 3.0 m or more.

A plan view of an individual segment 2 of the connecting element 1 of FIG. 1 is shown schematically in FIGS. 2 A and 2 B. FIG. 2 A shows the segment 2 before pre-assembling or fixing of the connecting element to a first component. FIG. 2 B shows the segment 2 after pre-assembling or fixing of the connecting element to a first component. The first component is not shown in FIGS. 2 A and 2 B. In the individual segment 2 of the connecting element there are provided two openings 3 of the metal substrate of the connecting element.

Figure 2A:
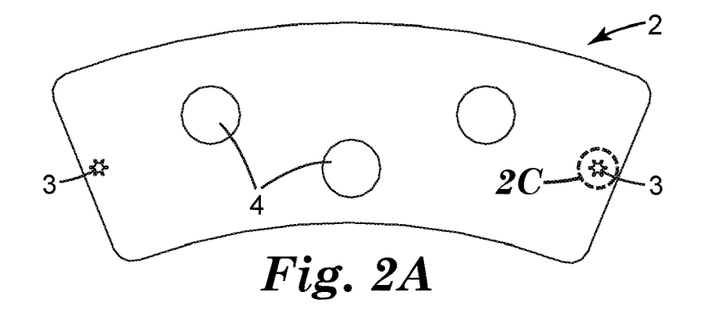
Figure 2B:
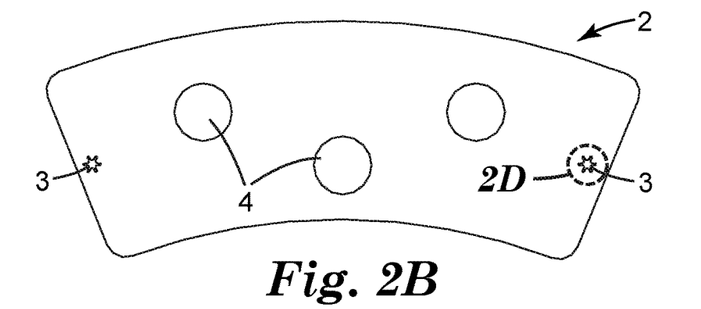
Figure 2C:
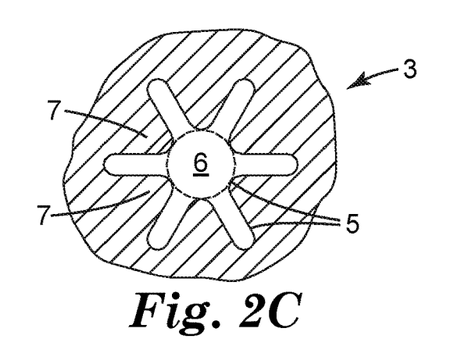
Figure 2D:
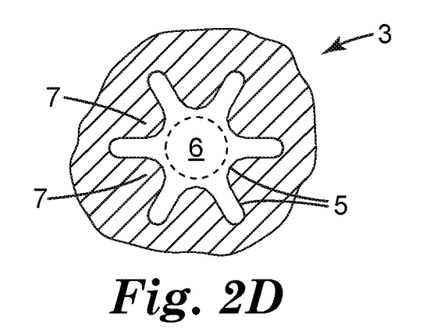
Figure 3A:
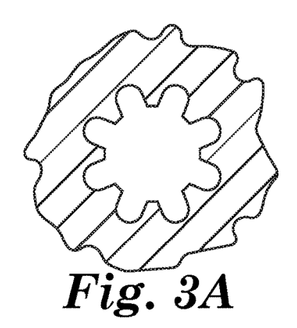
Figure 3B:
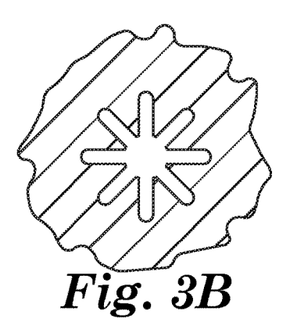
Figure 3C:
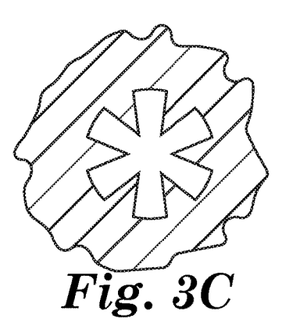
Figure 3D:
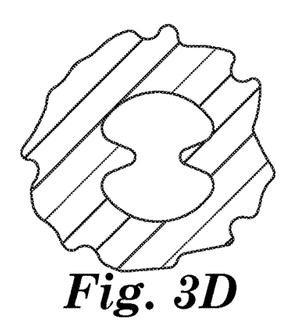
Figure 3E:
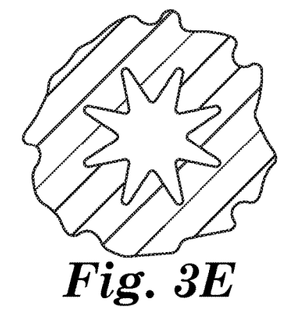
Figure 3F:
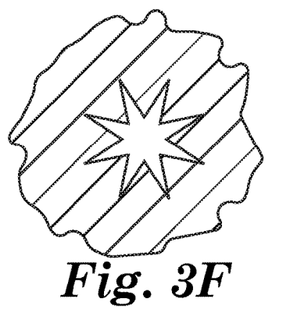
Figure 3G:
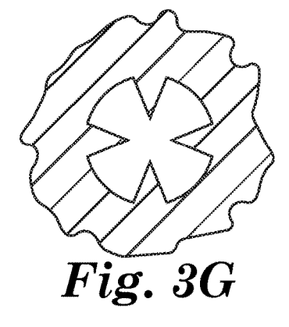
Figure 3H:
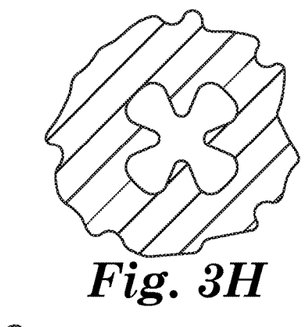
Figure 3I:
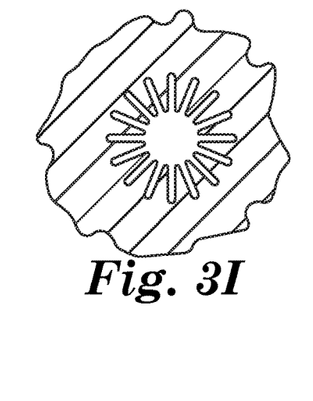
Figure 3J:
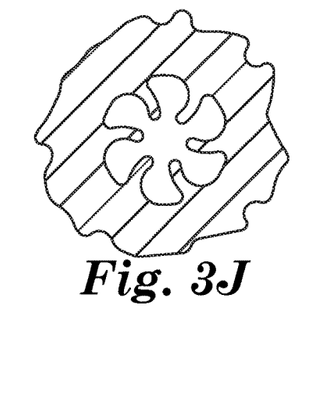
Figure 3K:
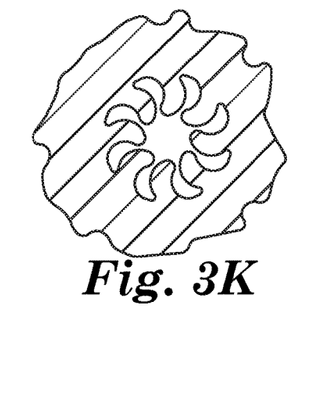

FIG. 2 C shows an enlarged detail of one of the two openings shown in FIG. 2 A, FIG. 2 D shows an enlarged detail of one of the two openings shown in FIG. 2B. The opening 3 has an outer contour 5 and an inner hole 6. At the outer contour 5 of the opening 3 there are six extensions 7 of the metal substrate which are directed towards the inner hole 6 of the opening. The inner hole 6 is a central hole of the opening 3. In the plan view of FIG. 2 D, which shows the opening after fixing the connecting element to a first component and detaching it again, the extensions 7 appear shorter than in FIG. 2 C, because they have been bent down.

FIGS. 3 A-3 K show details of a connecting element, representing various forms of an opening of the metal substrate of the connecting element. FIGS. 3A and 3B are preferred embodiments of the opening. The hatched region is the metal substrate, the inner white region is the opening. On the metal substrate hard particles are fixed by means of a metallic binder layer. The openings have an inner hole in the centre of the opening, i.e. a central hole. At the outer contour of the opening, there are extensions of the metal substrate, the extensions being directed towards the central hole of the opening. In FIGS. 3 A, 3 B, 3 E, 3 F and 3 K, there are eight extensions of the metal substrate at the outer contour of the opening. In FIGS. 3 C and 3 J, there are six extensions of the metal substrate at the outer contour of the opening. In FIG. 3 D, there are two extensions of the metal substrate at the outer contour of the opening. In FIGS. 3 G and 3 H, there are four extensions of the metal substrate at the outer contour of the opening. In FIG. 3 I, there are sixteen extensions of the metal substrate at the outer contour of the opening.

Figure 4A:
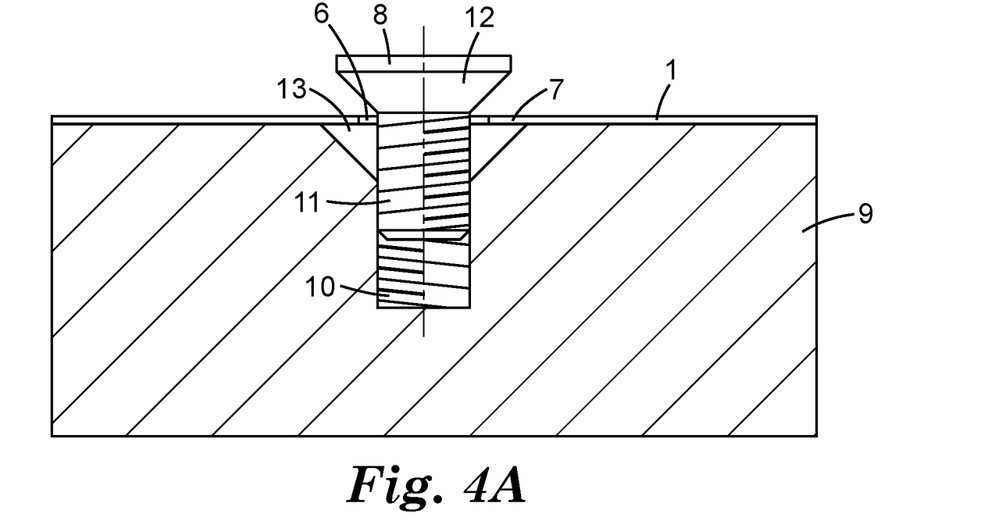
Figure 4B:
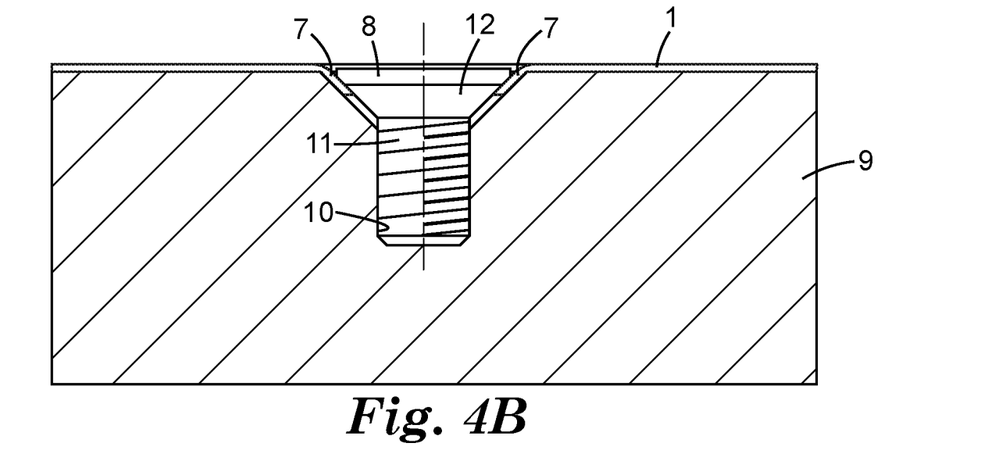

FIGS. 4 A and 4 B each schematically shows a cross-sectional view of a device of the present disclosure, comprising a connecting element 1, a fastening element 8 and a first component 9, before (FIG. 4 A) and after (FIG. 4 B) pre-assembling or fixing the connecting element 1 to the first component 9. The fastening element 8 is a screw. In FIG. 4 A, the screw shaft 11 is inserted in the inner hole 6 of the opening of the metal substrate and the lower part of the recess, i.e. in the threaded bore 10, of the first component. After inserting the screw shaft 11 into the treaded bore 10 of the first component, the screw is tightened. By tightening the screw, the extensions 7 of the metal substrate at the outer contour of the opening are bent down and are caused to lie partially below the screw head 12 (see FIG. 4 B). The screw head 12 is not protruding from the connecting element 1. The screw head 12, after tightening the screw, is located within the upper part 13 of the recess of the first component 9. The screw shaft 11 is in the lower part of the recess, i.e. in the threaded bore 10.

Figure 5A:
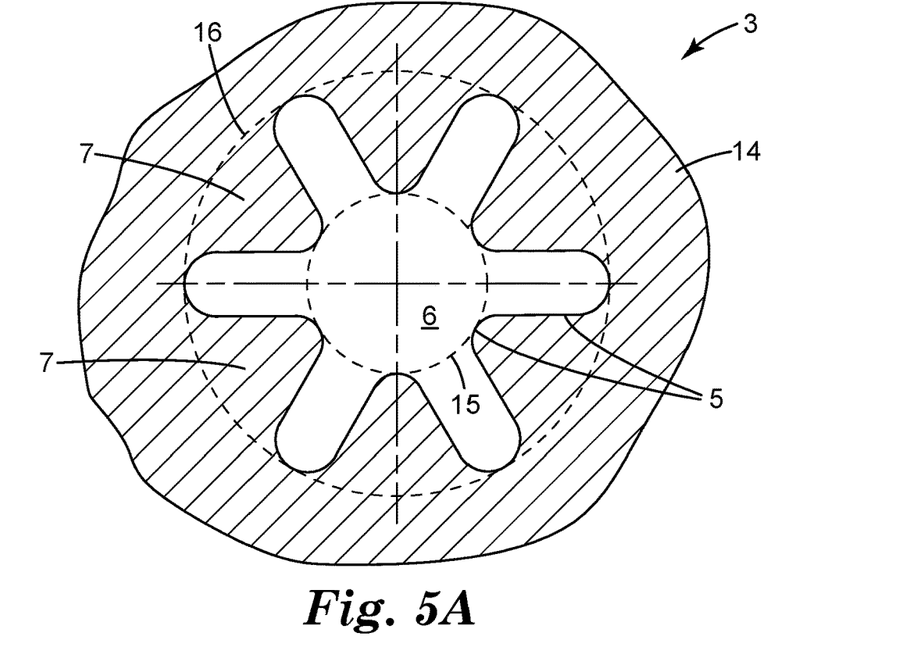

FIG. 5 A schematically shows a plan view of a detail of a connecting element of the present disclosure, representing an opening 3 of the metal substrate of the connecting element, before fixing the connecting element to a first component. The hatched region represents the metal substrate 14, the inner white region is the opening. On the metal substrate hard particles are fixed by means of a metallic binder layer. The opening has an inner hole 6 in the centre of the opening, i.e. a central hole. The central hole is shown in the drawing by the dashed line 15 representing the inscribed circle of the opening. At the outer contour 5 of the opening, there are six extensions 7 of the metal substrate, wherein the extensions 7 are directed towards the central hole 6 of the opening. The connecting element is planar, and the extensions extend in the plane of the connecting element. The inner hole 6 is dimensioned so that a shaft of a fastening element, for example a screw shaft, can be inserted into the inner hole, for fixing the connecting element to a first component. The outer contour of the opening has a circumscribed circle 16. The diameter of the circumscribed circle is at least the outer diameter of the head of the fastening element, for example of the head of the screw, which is used for fixing the connecting element to a first component. Preferably, the diameter of the circumscribed circle is larger than the outer diameter of the head of the fastening element, for example of the head of the screw, which is used for fixing the connecting element to a first component.

The outer contour 5 of the opening has no sharp edges, specifically the transitions from the outer contour at the circumscribed circle 16 to the outer contour of the extensions 7 are rounded. This has the advantage that the extensions will not tear at the transitions when the extensions are bent down by fastening the fastening element, for example by tightening the screw, which is inserted in the inner hole 6 of the opening. The extensions 7 at their end at the inner hole 6 of the opening may also have a rounded shape.

Figure 5B:
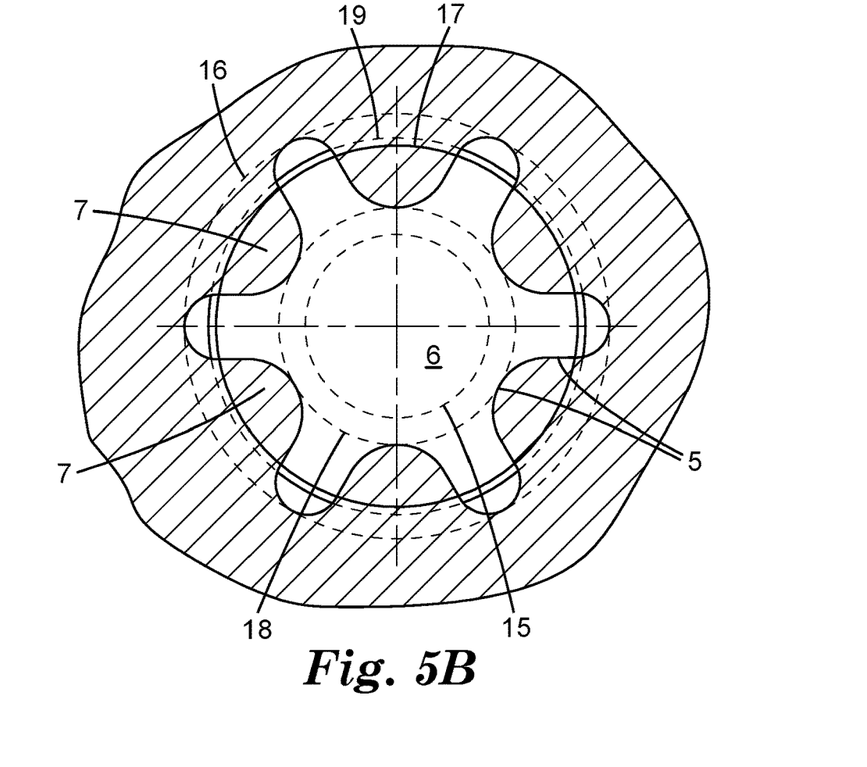
Figure 6A:
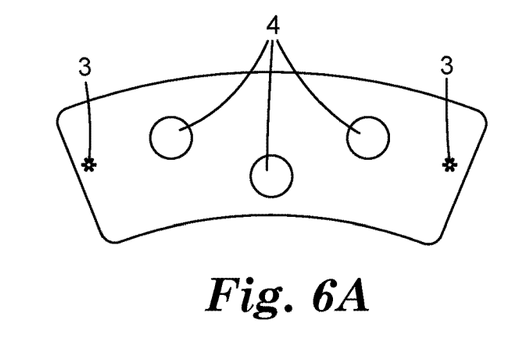
Figure 6B:
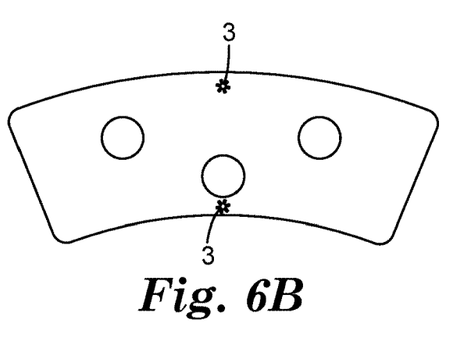
Figure 6C:
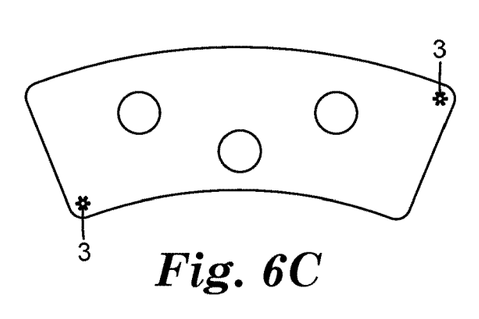
Figure 6D:
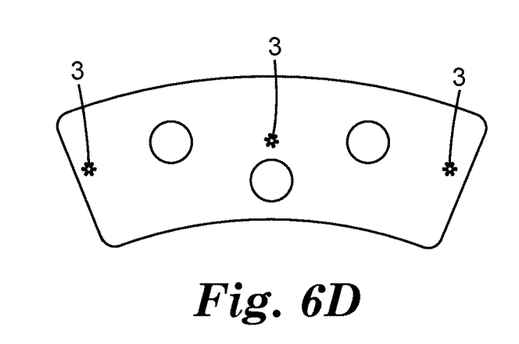
Figure 6E:
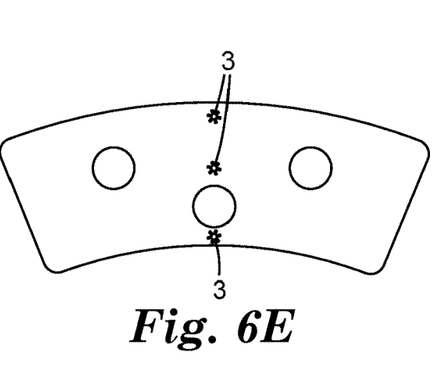
Figure 6F:
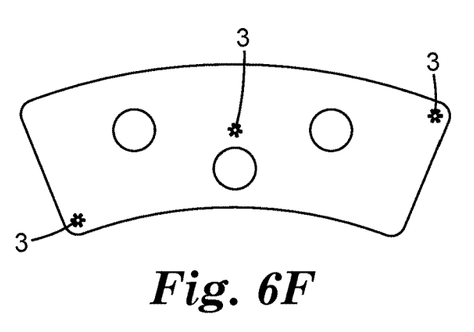

FIG. 5 B shows a detail of a connecting system of the present disclosure. FIG. 5 B schematically shows a plan view of a detail of a connecting element of the present disclosure and the head of a fastening element, for example a screw, representing the opening of the metal substrate of the connecting element of FIG. 5 A after pre-assembling or fixing the connecting element to a first component. The circle 17 is the outer circumference of the screw head of the screw which has been inserted in the inner hole 6 of the opening and in the threaded bore of the first component and has been tightened. The inner parts of the extensions 7 are lying below the screw head. The extensions 7 are appearing shorter in FIG. 5 B than in FIG. 5 A, as they have been bent down by tightening the screw. The inner hole 6 is also shown in FIG. 5 B by the dashed line 15 representing the inscribed circle of the opening, showing the diameter of the inner hole before the extensions 7 have been bent down. The dashed line 18 shows the inner hole 6 of the opening after the extensions 7 have been bent down, representing the inscribed circle of the opening. The outer contour 5 of the opening has a circumscribed circle 16. The circular line 19 shows the outer circumference of the upper part of the recess of the first component, in which the screw has been inserted. The hatching of the inner parts of the extensions 7 which are lying under the screw head, i.e. within the circle 17, is shown with dot-and-dash lines.

FIGS. 6 A-6 F each schematically shows a plan view of an individual segment of a connecting element of the present disclosure, representing various possibilities of positioning openings 3 for pre-assembling. The connecting element is ring-shaped. FIG. 6 A is a preferred embodiment. The arrangements of openings shown in FIGS. 6 A-6 F are examples, other ways of positioning are also possible. Holes 4 are used for screws or bolts which are put through the holes 4, for connecting a first and second component with the connecting element disposed between the first and second component.

Further disclosed herein is also a process for producing a connecting element as disclosed herein, comprising
  providing a metal substrate having two opposite joining surfaces,
  providing in the metal substrate at least one opening having an outer contour and an inner hole, wherein at the outer contour of the at least one opening there is at least one extension of the metallic substrate, wherein the at least one extension is directed towards the inner hole of the at least one opening,
  and coating the joining surfaces with hard particles and fixing them on the metal substrate by means of a metallic binder layer.

The openings may be produced by laser cutting, die cutting, waterjet cutting, or stamping.

The metallic binder layer may be a nickel layer. The metallic binder layer may be produced by means of an electrodeposition process, for example by an external current-free (=chemical) electroplating process, also called electroless plating process, preferably by an electroless nickel plating process. The hard particles may be applied on the joining surfaces of the metal substrate by means of an electrodeposition process, for example by an electroless nickel plating process, using a chemical nickel bath with dispersed hard particles. Such electrodeposition and electroplating processes are customary in coating technology. The chemical nickel layer can be hardened by means of a heat treatment at up to about 400° C., with the result that the adhesion to the metal substrate is improved and the inherent hardness of the layer is increased. The hard particles are fixed on the metal substrate by means of the metallic binder layer.

In some embodiments of the connecting element, at least one portion of the metallic binder layer and optionally of the hard particles of at least one of the two opposite joining surfaces is coated with at least one layer of a coating material, the coating material being a polymeric material. The coating material may be a deformable material. The coating material can be elastically deformable or plastically deformable or both. The coating material can be a thermoplastic polymer, a duroplastic polymer or an elastomeric polymer. For example, the coating material can be selected from the group consisting of polyester materials, acrylic materials, epoxy materials, formaldehyde resins, polyurethane materials, polyvinylacetate (PVAC) materials, polyvinyl butyral (PVB) materials, polyvinyl chloride (PVC) materials, silicone materials, rubber materials and combinations thereof. An example for acrylic materials are polyacrylates, an example for polyurethane materials are thermoplastic polyurethane (TPU) materials, examples for rubber materials are styrene butadiene rubber, chloroprene rubber and isoprene rubber.

The thickness of the at least one layer of the polymeric coating material may be from 1 to 70 µm, or from 5 to 70 µm, or from 5 to 65 µm. In some embodiments, the thickness of the at least one layer of the polymeric coating material may be from 15 to 50 µm.

The layer of the polymeric coating material can seal roughnesses and irregularities of the joining surfaces of the components to be joined and therefore can increase the sealing effect between two components to be joined. In some embodiments, the connection achieved by the connecting element is gas-tight. In some embodiments, the polymeric coating material, such as the epoxy or acrylic or other materials, can have sealing properties or adhesive properties or both sealing and adhesive properties.

The connecting element disclosed herein and the connecting system disclosed herein may be used for friction-increasing connection of a first and a second component in energy generation, specifically in wind turbines and hydropower turbines, and in machine, plant, motor vehicle and aircraft construction. The connecting element and the connecting system disclosed herein may be used for friction-increasing, play-free and/or reversible connection of a first and a second component in energy generation, specifically in wind turbines and hydropower turbines, and in machine, plant, motor vehicle and aircraft construction.

In principle, the connecting element and the connecting system disclosed herein can be used in any type of frictional connection throughout the field of mechanical engineering, and in particular, if the forces which can be transmitted by the component surfaces which are imposed by the design are insufficient.

For example, the connecting element and the connecting system disclosed herein can be used for frictional connections, such as bolted or clamped connections, between components of wind turbines, such as segments of segmented towers, or rotor hub and rotor shaft, or rotor brake and generator, or rotor brake and gearbox, or between parts or components of hydropower plants, such as turbine wheel and generator shaft, or between components of vehicles.

The invention claimed is:

1. A connecting system, comprising
  a connecting element, comprising a metal substrate having two opposite joining surfaces, wherein the joining surfaces are provided with hard particles, which are fixed on the metal substrate by means of a metallic binder layer, and wherein the metal substrate has at least one opening having an outer contour and an inner hole, and wherein at the outer contour of the opening there is at least one extension of the metal substrate, wherein the at least one extension is directed towards the inner hole of the opening, and
  at least one fastening element, wherein the number of fastening elements corresponds to the number of openings of the metal substrate of the connecting element, and wherein the at least one fastening element has a shaft and a head;
  wherein the diameter of the inner hole of the at least one opening is at least the major diameter of the shaft of the fastening element, multiplied by a factor of 1.05 and the diameter of the inner hole is at most the major diameter of the shaft of the fastening element, multiplied by a factor of 1.50 so that the shaft can be inserted into the inner hole of the at least one opening.

2. The connecting system of claim 1, wherein the diameter of the inner hole is at most the major diameter of the shaft of the fastening element, multiplied by a factor of 1.15.

3. The connecting system of claim 1, wherein the outer contour of the at least one opening of the metal substrate of the connecting element has a circumscribed circle, and wherein the diameter of the circumscribed circle is at least the outer diameter of the head of the fastening element and at most the outer diameter of the head of the fastening element multiplied by a factor of 2.0.

4. The connecting system of claim 1, wherein the connecting element is planar, and wherein the at least one extension extends in the plane of the connecting element.

5. The connecting system of claim 1, wherein the inner hole of the at least one opening is a central hole.

6. The connecting system of claim 1, wherein the at least one extension is provided with hard particles, which are fixed on the metal substrate by means of a metallic binder layer.

7. The connecting system of claim 1, wherein at least one portion of the metallic binder layer of at least one of the two opposite joining surfaces is coated with at least one layer of a coating material and wherein the coating material is a polymeric material.

8. The connecting system of claim 7, wherein the least one fastening element is a countersunk screw.

9. A process for fixing the connecting system of claim 1 to a first component which has a joining surface, comprising
providing a number of the fastening elements corresponding to the number of openings of the metal substrate of the connecting element,
providing a recess in the first component, wherein the recess has an upper part at the joining surface and a lower part, and wherein the lower part of the recess is a bore corresponding to the shaft of the at least one fastening element of the connecting system, and wherein the upper part of the recess has a height being at least the sum of the height of the head of the fastening element and the thickness of the metal substrate and of the metallic binder layer, and wherein the upper part of the recess has a diameter at the joining surface being at least the sum of the diameter of the head of the fastening element and the thickness of the metal substrate and of the metallic binder layer,
inserting the shaft of the fastening element into the inner hole of the at least one opening of the metal substrate and the bore of the first component; wherein the diameter of the inner hole of the at least one opening is at least the major diameter of the shaft of the fastening element, multiplied by a factor of 1.05 and the diameter of the inner hole is at most the major diameter of the shaft of the fastening element, multiplied by a factor of 1.50 so that the shaft can be inserted into the inner hole of the at least one opening,
fastening the fastening element,
bending down the at least one extension of the at least one opening by fastening the fastening element, and causing the at least one extension to lie at least partially below the head of the fastening element by fastening the fastening element,
thereby fixing the connecting element to the first component,
wherein the head of the fastening element after fastening the fastening element is not protruding from the connecting element.

10. A process for producing the connecting system of claim 1, comprising
providing a metal substrate having two opposite joining surfaces,
providing in the metal substrate at least one opening having an outer contour and an inner hole, wherein at the outer contour of the at least one opening there is at least one extension of the metallic substrate, wherein the at least one extension is directed towards the inner hole of the at least one opening,
coating the joining surfaces with hard particles and fixing them on the metal substrate by means of a metallic binder layer; and
providing at least one fastening element, wherein the number of fastening elements corresponds to the number of openings of the metal substrate of the connecting element, and wherein the at least one fastening element has a shaft and a head;
wherein the diameter of the inner hole of the at least one opening is at least the major diameter of the shaft of the fastening element, multiplied by a factor of 1.05 and the diameter of the inner hole is at most the major diameter of the shaft of the fastening element, multiplied by a factor of 1.50 so that the shaft can be inserted into the inner hole of the at least one opening.

11. A device comprising the connecting system of claim 1 and a first component having a joining surface, wherein the first component has a recess having an upper part at the joining surface of the first component and a lower part, and wherein the lower part of the recess is a bore corresponding to the shaft of the fastening element, and wherein the upper part of the recess has a height being at least the sum of the height of the head of the fastening element and the thickness of the metal substrate and of the metallic binder layer, and wherein the upper part of the recess has a diameter at the joining surface being at least the sum of the diameter of the head of the fastening element and the thickness of the metal substrate and of the metallic binder layer.

12. The device of claim 11, wherein the at least one fastening element is inserted in the inner hole of the at least one opening of the metal substrate and the bore of the first component, and wherein the fastening element is fastened, and wherein by fastening of the fastening element the at least one extension of the at least one opening is bent down and is lying at least partially below the head of the fastening element, thereby fixing the connecting element to the first component, and wherein the head of the fastening element after fastening the fastening element is not protruding from the connecting element.

13. The device of claim 12, further comprising a second component having a joining surface, and wherein the first and second component are frictionally joined with the connecting element.

* * * * *